(12) United States Patent
Beaufreton et al.

(10) Patent No.: US 11,827,803 B2
(45) Date of Patent: Nov. 28, 2023

(54) COATING COMPOSITIONS INCLUDING A POLYESTER, ARTICLES, AND METHODS OF COATING

(71) Applicant: SWIMC LLC, Cleveland, OH (US)

(72) Inventors: Christine Beaufreton, Gorges (FR); Arnaud Jegousse, Larmor-plage (FR); Sebastien Gibanel, Givry (FR); Paul Cooke, West View, PA (US); Benjamin Campagne, Montbellet (FR); Matthieu Andriot, Attignat (FR); Philippe Michel, Le Temple de Bretagne (FR); Floraine Collette, Coureon (FI)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/056,943

(22) Filed: Nov. 18, 2022

(65) Prior Publication Data

US 2023/0092062 A1    Mar. 23, 2023

Related U.S. Application Data

(63) Continuation of application No. PCT/IB2021/000385, filed on Jun. 3, 2021.

(60) Provisional application No. 62/704,936, filed on Jun. 3, 2020.

(51) Int. Cl.
| | |
|---|---|
| *C09D 167/02* | (2006.01) |
| *C08G 63/183* | (2006.01) |
| *C08G 63/199* | (2006.01) |
| *C08K 3/22* | (2006.01) |
| *C08K 5/29* | (2006.01) |
| *B65D 23/02* | (2006.01) |
| *B65D 5/56* | (2006.01) |
| *B65D 23/08* | (2006.01) |

(52) U.S. Cl.
CPC .......... *C09D 167/02* (2013.01); *B65D 5/563* (2013.01); *B65D 23/02* (2013.01); *B65D 23/0821* (2013.01); *C08G 63/183* (2013.01); *C08G 63/199* (2013.01); *C08K 3/22* (2013.01); *C08K 5/29* (2013.01); *C08K 2003/2241* (2013.01)

(58) Field of Classification Search
CPC .. C09D 167/02; C08G 63/183; C08G 63/199; C08K 3/22; C08K 5/29; C08K 2003/2241; B65D 5/563; B65D 23/02; B65D 23/0821
USPC ........................................................ 524/539
See application file for complete search history.

(56) References Cited

U.S. PATENT DOCUMENTS

| | | |
|---|---|---|
| 5,739,215 A | 4/1998 | Westerhof et al. |
| 8,367,171 B2 | 2/2013 | Stenson et al. |
| 8,449,960 B2 | 5/2013 | Skillman et al. |
| 9,598,602 B2 | 3/2017 | Kuo et al. |
| 9,828,522 B2 | 11/2017 | Argyropoulos et al. |
| 2014/0018484 A1* | 1/2014 | Kim ..................... C09D 167/02 524/391 |
| 2014/0131353 A1 | 5/2014 | Knotts et al. |
| 2016/0115345 A1 | 4/2016 | Kuo et al. |
| 2016/0115347 A1 | 4/2016 | Kuo et al. |
| 2016/0297994 A1 | 10/2016 | Kuo et al. |
| 2017/0327272 A1 | 11/2017 | Chasser et al. |
| 2018/0223126 A1 | 8/2018 | Beccaria et al. |
| 2020/0181338 A1* | 6/2020 | Collins .................. C08G 63/12 |

FOREIGN PATENT DOCUMENTS

| | | | |
|---|---|---|---|
| JP | 2004323627 A | * | 11/2004 |
| JP | 2005-126635 A2 | | 5/2005 |
| JP | 2005126635 A | * | 5/2005 |

OTHER PUBLICATIONS

International Search Report for PCT application No. PCT/IB2021/000385, dated Oct. 19, 2021 (3 pages).
Written Opinion for PCT application No. PCT/IB2021/000385, dated Oct. 19, 2021 (4 pages).
Product Data Sheet for Uralac SH978 S1E5-50, DSM Coating Resins, Dec. 2021, 2 pages.
Technical Data Sheet for Eastman Tetrashield MP2101, 2022, 1 page.
Technical Data Sheet for Eastman Tetrashield MP2100, 2022, 1 page.
Technical Data Sheet for Eastman Tetrashield MP2103, 2022, 1 page.
Product Data Sheet for Uralac SH992 S1-45, Covestro, 2022, 2 pages.

* cited by examiner

*Primary Examiner* — Kelechi C Egwim
(74) *Attorney, Agent, or Firm* — Honigman LLP

(57) ABSTRACT

The present disclosure provides a coating composition useful as a coating on food cans, and particularly as interior white or gold food can coatings. The coating composition includes a polyester polymer preferably having a number average molecular weight (Mn) of less than 10,000, a glass transition temperature (Tg) of more than 60° C., and a hydroxyl value greater than 10 mg KOH/g resin. The polyester preferably includes one or more cyclic groups selected from a mono-cyclic group having five ring members or less, a polycyclic group, or both, preferably in a backbone of the polyester polymer.

22 Claims, No Drawings

COATING COMPOSITIONS INCLUDING A POLYESTER, ARTICLES, AND METHODS OF COATING

This application is a continuation of International Application No. PCT/IB2021/000385 filed on Jun. 3, 2021, which itself claims priority to U.S. Provisional Application Ser. No. 62/704,936 filed on Jun. 3, 2020, both entitled "COATING COMPOSITIONS INCLUDING A POLYESTER, ARTICLES, AND METHODS OF COATING," each of which is incorporated herein by reference in its entirety

BACKGROUND

The balance of coating performance attributes required for a coating composition to be suitable for use as a food or beverage container coating are particularly stringent and are unique from other coating end uses. As such, coatings designed for other end uses are not typically suitable for use as food or beverage container coatings.

For example, coatings for use on food or beverage containers should avoid unsuitably altering the taste of the packaged food or beverage products, and should also avoid flaking or chipping into the packaged products. The coatings should also resist chemically aggressive food or beverage products (which can have a complex chemical profile, including salts, acids, sugars, fats, etc.) for extended periods of time (e.g., years). Food or beverage container coatings should also have good adhesion to the underlying substrate and remain sufficiently flexible after curing. This is because subsequent fabrication and denting during transportation, storage, or use (e.g., by dropping) may cause the metal substrate to deform, which will cause the coating to flex. A brittle coating will crack during flexure, exposing the container metal to the packaged products, which can sometimes cause a leak in the container. Even a low probability of coating failure may cause a significant number of containers to leak, given the high number of food and beverage containers produced.

Various coatings have been used as protective food or beverage container coatings, including epoxy coatings and polyvinyl-chloride-based coatings. Each of these coating types, however, has potential shortcomings. For example, the recycling of materials containing polyvinyl chloride or related halide-containing vinyl polymers can be problematic. There is also a desire by some to reduce or eliminate certain epoxy compounds (e.g., bisphenol A) commonly used to formulate food-contact epoxy coatings. Although a number of replacement coating compositions made without such materials have been proposed, some replacement compositions have exhibited insufficient coating properties such as insufficient corrosion resistance on metal substrates, insufficient flexibility, or insufficient toughness.

To address the aforementioned shortcomings, the packaging coatings industry has sought coatings based on alternative binder systems such as polyester resin systems, for example. It has been problematic, however, to formulate polyester-based coatings that exhibit the required balance of coating characteristics (e.g., flexibility, adhesion, corrosion resistance, stability, resistance to crazing, etc.). For example, there has typically been a tradeoff between corrosion resistance and fabrication properties for such coatings. Polyester-based coatings suitable for food-contact that have exhibited both good fabrication properties and an absence of crazing have tended to be too soft and exhibit unsuitable corrosion resistance. Conversely, polyester-based coatings suitable for food contact that have exhibited good corrosion resistance have typically exhibited poor flexibility and unsuitable crazing when fabricated.

Accordingly, it will be appreciated that what is needed in the art are improved coating compositions that exhibit the stringent balance of coating properties to permit the use of such coating compositions on food or beverage containers.

SUMMARY OF THE DISCLOSURE

The present disclosure provides food or beverage container coating compositions, articles having a coating formed from such compositions, and methods of coating. Herein, a food or beverage "container" is used to encompass containers such as pails or drums in addition to conventional cans.

In one embodiment, a food or beverage container coating composition is provided that includes a polyester and preferably a liquid carrier (e.g., an organic solvent). The polyester preferably has a number average molecular weight ("Mn") of less than 10,000, more preferably less than 9,000; a glass transition temperature ("Tg") of more than 60° C.; and a hydroxyl value greater than 10 mg KOH/g resin, more preferably greater than 15 mg KOH/g resin. In preferred embodiments, the polyester polymer is formed from reactants including one or more cyclic-group containing diols, more preferably one or more cyclic-group containing diols having a mono-cyclic group having five ring members or less, a polycyclic group (e.g., a bicyclic or tricyclic group), or both. In preferred embodiments, the coating composition includes one or more crosslinkers, more preferably one or more hydroxy-reactive crosslinker.

In another embodiment, a food or beverage container is provided that includes a metal substrate having a surface (e.g., an inside or interior surface, an exterior surface, or both) at least partially coated with a coating formed from the coating composition of the present disclosure.

In another embodiment, a method is provided that includes: providing a coating composition as described herein; applying the coating composition to at least a portion of a metal substrate (e.g., a metal sheet) prior to or after forming the metal substrate into a food or beverage container or portion thereof; and thermally curing the coating composition.

The terms "polymer" and "polymeric material" include, but are not limited to, organic homopolymers, copolymers, such as, for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., includes, comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other claims are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one" and "one or more." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C.

The terms "solids" and "non-volatile content" are used interchangeably, herein. Thus, for example, the total solids and the total non-volatile content ("NVC") of a given composition are the same. By way of example, the total solids of a liquid composition can be determined by volatilizing off the volatile content of the liquid coating composition, with the percent solids of the liquid composition being the weight percentage of the remaining non-volatile content relative to the initial starting weight.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION OF ILLUSTRATIVE EMBODIMENTS

The present disclosure provides food or beverage container coating compositions, articles having a coating formed from such compositions, and methods of coating.

In preferred embodiments, the coating composition is a polyester-based coating composition that includes a hydroxyl-functional polyester. In preferred embodiments, the polyester polymer has a number average molecular weight (Mn) of less than 10,000, less than 9,500, less than 9,000, less than 8,500, less than 8,000, less than 7,000, less than 6,500, or less than 6,000. Although not presently preferred, in some embodiments, the polyester polymer may have an Mn of less than 15,000, less than about 12,000, or less than about 11,000. Typically, the polyester polymer will have an Mn that is at least at least 2,000, at least 2,500, and more preferably at least 3,000, at least 3,500, at least 4,000, at least 5,000, or at least 6,000. In certain preferred embodiments, the polyester polymer has an Mn of about 2,500 to about 8,000, about 3,000 to about 7500, or about 3,500 to about 7,000. The Mn can be determined by Gel Permeation Chromatography (GPC), measured against a set of polystyrene standards of varying molecular weights.

The polyester polymer can exhibit any suitable polydispersity index (PDI), which can be calculated based on the determined weight-average molecular weight (Mw) and the Mn. That is, PDI is Mw/Mn. In preferred embodiments, the polyester polymer has a PDI of no more than about 5, no more than about 4, no more than about 3.5, or no more than about 3. While the minimum PDI value is not restricted, typically it will be at least about 1.5, at least about 1.75, at least about 2, or at least about 2.25. Similar to Mn, Mw can be determined via GPS using polystyrene standards.

The polyester polymer of the present disclosure can have any suitably backbone configuration. Depending on the embodiment, the polymer can be linear, substantially linear, or branched. In presently preferred embodiments, the polyester polymer is linear. Similarly, the polyester polymer can be saturated or unsaturated. Typically, the backbone of the polyester polymer includes a plurality of aromatic groups.

In preferred embodiments, at least one end of the backbone of the polyester polymer of the present disclosure is hydroxyl-terminated. More preferably, the backbone is terminated on each end with a hydroxyl group, where at least one, and more preferably both, of the hydroxyl groups are primary hydroxyl groups. The polyester polymer may also, or alternatively, include one or more, or a plurality, of hydroxyl groups located at non-terminal locations of the polymer (e.g., as pendant groups). In some embodiments, polyester polymer only includes hydroxyl groups at terminal ends of the backbone and nowhere else.

The hydroxyl value (also called "hydroxyl number") of the polyester polymer may be determined using the test method disclosed later herein. In preferred embodiments, the polyester has a hydroxyl value of more than 10, at least 11, at least 12, at least 13, at least 14, more preferably at least 15, at least 16, at least 17, at least 18, at least 19, at least 20, at least 21, at least 22, at least 23, at least 24, at least 25, at least 26, or at least 27 milligrams (mg) KOH per gram (g) resin. While the maximum value for the hydroxyl value is not particularly restricted, due to, for example, molecular weight considerations, it will typically be less than 100, less than 80, less than 60, less than 50, less than 45, less than 40, less than 35, less than 32, less than 30, or less than 29 mg KOH/g resin. In presently preferred embodiments, the polyester polymer has a hydroxyl value of more than 10 to less than 40 mg KOH/g resin, at least 15 to no more than 35 mg KOH/g resin, or at least 15 to no more than 30 mg KOH/g resin.

The polyester polymer of the present disclosure may have any suitable acid value (also referred to as "acid number"). However, to achieve the desired hydroxyl value, typically the polyester will exhibit an acid value, if any, of less than 20, less than 10, less than 5, less than 2, or less than 1 mg KOH/g resin.

When used to formulate an interior food can coating composition, and especially for coatings intended for use in packaging so called "hard-to-hold" products, the polyester polymer preferably exhibits a glass transition temperature (Tg) that is sufficiently high to yield the desired corrosion resistance properties. Accordingly, the polyester polymer preferably has a glass transition temperature (Tg) of at least about 60° C., at least about 65° C., at least about 70° C., at least about 75° C., or at least about 80° C. While the maximum Tg of the polymer is not particularly restricted, typically it will be less than about 130° C., less than about 110° C., less than about 100° C., less than about 90° C., or less than about 85° C. Differential scanning calorimetry ("DSC") is a useful method for determining Tg. An example of a useful DSC methodology is provided later herein.

The polyester polymer preferably includes one or more cyclic groups, and more preferably a plurality of cyclic groups. Cyclic groups located in the polyester backbone are preferred, although pendant cyclic group(s) may also be present. In some embodiments, the polyester polymer includes one or more alicyclic groups optionally in combination with one or more aromatic and/or unsaturated cyclic groups. In preferred embodiments, the polyester polymer includes one or more cyclic groups selected from polycyclic groups or mono-cyclic groups having five ring members or less. Such cyclic groups may optionally include one or more heteroatoms (e.g., oxygen or nitrogen). Any suitable monomers may be used to introduce such cyclic groups into the polyester polymer, with preferred monomers including dicarboxylic acids (or an anhydride or alkyl ester of a dicarboxylic acid), diols, and combinations thereof. Typically, at least some of the polycyclic groups and/or monocyclic groups having five rings members or less are present in structural unit(s) derived from a diol.

When present, the polycyclic groups may include any suitable number of rings (e.g., 2, 3, or 4 or more), with bicyclic and tricyclic groups being preferred. Suitable bicyclic groups may include any combination of saturated, unsaturated, and/or aromatic rings, which may be fused, bridged, or Spiro with respect to each other. Similarly, the tricyclic groups may be any combination of saturated, unsaturated, and/or aromatic rings in any configuration relative to one another (e.g., fused, bridged, and/or spiro). Examples of suitable polycyclic groups include a norbornane group, a norbornene group, an isosorbide group, a naphthalene group, a tricyclodecane group, and substituted variants thereof. In some embodiments, the polyester polymer includes one or more bicyclic-group-containing structural units derived from isosorbide; nadic acid; a Diels-Alder reaction product of maleic anhydride and dicyclopentadiene; a naphthalene dicarboxylic acid (e.g., 1,4- or 2,6-napthalene dicarboxylic acid); a spirocyclic diol (e.g., 3,9-bis(1,1-dimethyl-2-hydroxyethyl)-2,4,8,10-tetraoxaspiro[5.5]undecane (shown below)), a derivative thereof (e.g., nadic anhydride, methyl nadic acid, or methyl nadic anhydride), or a combination thereof.

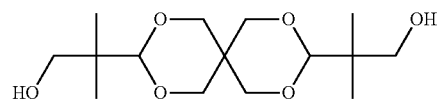

3,9-bis(1,1-dimethyl-2-hydroxyethyl)-2,4,8,10-tetraoxaspiro[5.5]undecane

In presently preferred embodiments, the polyester polymer includes one or more, more preferably a plurality, of tricyclic groups present in structural units derived from tricyclodecanedimethanol or a structural variant thereof (e.g., a substituted variant thereof).

In certain preferred embodiments, the polyester polymer includes at least about 20% by weight ("wt-%"), more preferably at least about 30 wt-%, or even more preferably at least about 40 wt-% of structural units derived from a tricyclic-group-containing diol (preferably tricyclodecanedimethanol), based on the total weight of reactants used to form the polyester polymer. The polyester polymer preferably includes less than 70 wt-%, more preferably less than 65 wt-%, or even more preferably less than 60 wt-% of structural units derived from a tricyclic-group-containing diol (preferably tricyclodecanedimethanol), based on the total weight of reactants used to form the polyester polymer.

As discussed above, in some embodiments, the polyester polymer may include one or more monocyclic groups having five ring members or less, with monocyclic groups having four or five members in the ring being preferred. In some embodiments, such monocyclic groups are alicyclic groups. Substituted or unsubstituted cyclobutane groups are preferred such monocyclic groups. Examples of suitable monomers for incorporating monocyclic groups having four ring members include cyclobutane diols, with 2,2,4,4-tetramethyl-1,3-cyclobutanediol shown below being particularly preferred.

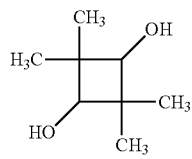

2,2,4,4-tetramethyl-1,3-cyclobutanediol

In some embodiments, the one or more monocyclic groups having 5-ring members or less may include one or more heteroatoms (e.g., nitrogen or oxygen) and/or one or more carbon-carbon double bonds, with furan groups being an example of such groups.

In presently preferred embodiments, the polyester polymer includes both (a) one or more aromatic cyclic groups (e.g., such as those present in backbone structural units formed from phthalic acid, terephthalic acid, isophthalic acid, or anhydrides or alkyl esters thereof), more typically a plurality of aromatic groups and (b) one or more, more typically a plurality of, polycyclic groups and/or monocyclic groups having 5 ring members or less. Typically, at least some (or all) of (a) are provided using a dicarboxylic acid (or anhydride or alkyl ester thereof) and at least some of (b) are provided using a diol.

In preferred embodiments, the polyester polymer is formed from reactants including: (i) one or more polycarboxylic acid (preferably a dicarboxylic acid), anhydride, or alkyl ester thereof and (ii) one or more polyol (preferably a diol). Aromatic dicarboxylic acids, anhydrides, or alkyl esters thereof are preferred polyacids. Diols having primary hydroxyl groups (as opposed to secondary or tertiary hydroxyl groups) are preferred diols. Preferably, at least 25% by weight ("wt-%"), at least 50 wt-%, at least 60 wt-%, at least 70 wt-%, at least 80 wt-%, at least 90 wt-%, or up to about 100 wt-% of the total polyol reactants used to make the polyester polymer are cyclic-group-containing polyols (e.g., polyols including any of the cyclic groups recited herein). Preferably, at least 25 wt-%, at least 50 wt-%, at least 60 wt-%, at least 70 wt-%, at least 80 wt-%, at least 90 wt-%, or up to about 100 wt-% of the total polycarboxylic acid reactants used to make the polyester polymer are aromatic polycarboxylic acids, anhydrides, and/or alkyl esters. In preferred embodiments, the one or more polyols include a C4 or higher aliphatic diol including a linear carbon chain that is at least four carbons in length (e.g., 1,4-butanediol, 1,5-pentanediol, 1,6-hexanediol, or a mixture thereof), a cyclic-group containing diol (more preferably a polycyclic-group-containing diol and/or or a diol containing a cyclic group having 5 rings members or less), or a combination thereof.

In certain preferred embodiments, the one or more polyols used to form the polyester polymer includes both a cyclic-group-containing diol, more preferably a polycyclic-group-containing diol, and a C4 or higher aliphatic diol having a linear chain that is at least four carbons in length, and even more preferably a C5 or higher aliphatic diol having a linear chain that is at least five carbons in length, and even more preferably 1,6-hexanediol. A polyol component including both tricyclodecanedimethanol and 1,4-butanediol, 1,5-pentanediol, and/or 1,6-hexanediol is particularly preferred.

In some embodiments, the reactants used to form the polyester polymer include a C5 or higher aliphatic diol. The C5 or higher aliphatic diol preferably includes a carbon chain that is at least four carbons in length, more preferably at least five carbon atoms in length, with an alcohol group attached at each end of the carbon chain. 1,6-hexanediol is a preferred such C5 or higher aliphatic diol. In such embodiments, the polyester polymer preferably includes at least 0.1 wt-%, at least 1 wt-%, at least 2 wt-%, at least 3 wt-%, or at least 4 wt-% of the C5 or higher aliphatic diol, based on the total weight of reactants used to form the polyester polymer. In such embodiments, the polyester polymer preferably includes less than 20 wt-%, preferably less than 15 wt-%, and even more preferably less than 10 wt-% of the C5 or higher aliphatic diol, based on the total weight of reactants used to form the polyester polymer.

It is believed that it can be quite beneficial from a coating performance standpoint if the polyester polymer includes one or more primary hydroxyl groups. While not intending to be bound by theory, it is believed that primary hydroxyl groups can provide better crosslinking (e.g., as indicated by a higher number of MEK double rubs), and thus enhanced coating properties, relative to non-primary hydroxyl groups such as, e.g., secondary hydroxyl groups. Thus, in preferred embodiments, at least 50 mole percent (mol-%), at least 60 mol-%, at least 70 mol-%, at least 80 mol-%, at least 95 mol-%, at least 99 mol-%, or up to 100 mol-% of the one or more polyols used to form the polyester polymer are polyols having primary hydroxyl groups, more preferably polyols that only include primary hydroxyl groups (i.e., no secondary or tertiary hydroxyl groups), even more preferably diols having two primary hydroxyl groups.

Preferably, at least 50%, at least 60%, at least 70%, at least 80%, at least 90%, or up to 100% of the hydroxyl groups present on the polyester polymer are primary hydroxyl groups. Direct quantitation of the proportion of hydroxyl groups present on a polyester polymer that are primary hydroxyl groups versus non-primary hydroxyl groups may prove difficult, although nuclear magnetic resonance ("NMR") may be one suitable method. Typically, such determination may be made based on the starting reactants used to make the polyester polymer.

Examples of suitable polyols for use in making the polyester of the present disclosure include diols, polyols having three or more hydroxyl groups (e.g., triols, tetraols, etc.), and combinations thereof. Suitable polyols may include, for example, ethylene glycol, propylene glycol, 1,3-propanediol, 2-methyl-1,3-propanediol, glycerol, diethylene glycol, dipropylene glycol, triethylene glycol, trimethylolpropane, trimethylol ethane, tripropylene glycol, neopentyl glycol, pentaerythritol, 1,4-butanediol, 1,6-hexanediol, hexylene glycol, cyclohexanedimethanol, tricyclodecane dimethanol, a polyethylene or polypropylene glycol, isopropylidene bis(p-phenylene-oxypropane-1-2), 2,2,4,4-tetramethyl-1,3-cyclobutanediol, isosorbide, 2,5-furandiol, 2,2-dimethylpropane-1,3-diol ("NPG"), and mixtures thereof. If desired, adducts of polyol compounds (e.g., triols, tetraols, etc.) and monofunctional compounds may be used.

Examples of suitable polycarboxylic acids include dicarboxylic acids, polycarboxylic acids having higher acid functionality (e.g., tricarboxylic acids, tetracarboxylic acids, etc.), anhydrides thereof, precursors or derivatives thereof (e.g., an esterifiable derivative of a polycarboxylic acid, such as a dimethyl ester or anhydride), or mixtures thereof. Suitable polycarboxylic acids may include, for example, maleic acid, fumaric acid, itaconic acid, succinic acid, adipic acid, phthalic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, terephthalic acid, isophthalic acid, trimellitic acid, naphthalene dicarboxylic acid, cyclohexane dicarboxylic acid, glutaric acid, dimer fatty acids (e.g., Radiacid 960 dimer fatty acid), nadic acid, furandicarboxylic acid, anhydrides or derivatives thereof (e.g., nadic anhydride, maleic anhydride, etc.), and mixtures thereof. If desired, adducts of polyacid compounds (e.g., triacids, tetraacids, etc.) and monofunctional compounds may be used. It should be understood that in synthesizing the polyester, the specified acids may be in the form of anhydrides, esters (e.g., alkyl ester), or like equivalent form. For sake of brevity, such compounds are referred to herein as "carboxylic acids" or "polycarboxylic acids" or "dicarboxylic acids".

The polyester polymer of the present disclosure is preferably not made using any isocyanate reactants (e.g., diisocyanates). As such, in preferred embodiments, the polyester polymer does not include any urethane linkages and is not a polyester-urethane polymer.

In some embodiments, the hydroxyl-functional polyester polymer of the present disclosure includes less than 4 wt-%, less than 3 wt-%, less than 1 wt-%, less than 0.5 wt-%, or less than 0.1 wt-%, if any, of 1,4-butanediol, based on the total weight of reactants used to form the polyester polymer.

Coating compositions of the present disclosure may include any suitable amount of one or more polyester polymers. Typically, the hydroxyl-functional polyester polymer of the present disclosure will constitute at least 50 wt-%, at least 75 wt-%, at least 90 wt-%, at least 95 wt-%, at least 99 wt-%, or 100 wt-% of the polyester polymer present in the coating composition. Preferably, the coating composition, based on total resin solids, includes at least 40 wt-%, at least 50 wt-%, at least 60 wt-%, at least 70 wt-%, at least 80 wt-%, or at least 90 wt-% of the hydroxyl-functional polyester polymer of the present disclosure. Based on total coating solids (as opposed to total resin solids), typically the coating composition will include at least 30 wt-%, at least 40 wt-%, at least 50 wt-%, or at least 60 wt-% of the hydroxyl-functional polyester polymer of the present disclosure.

Any suitable reaction process may be used to make the hydroxyl-functional polyesters of the present disclosure. Suitable such processes include, for example, processes in which polymerization occurs in the presence of a solvent such as reflux polymerization processes as well as processes in which polymerization occurs in the absence of added solvent such as melt-blend polymerization processes. The polyester polymer may, for example, be formed by direct esterification, transesterification, or a combination thereof, in one or more steps.

The coating compositions of the present disclosure typically includes a liquid carrier, which is typically an organic-solvent-based liquid carrier. In preferred embodiments, the coating composition is a substantially non-aqueous liquid coating composition that includes no more than a de minimus amount of water, if any (i.e., less than 2 wt-% of water, less than 1 wt-% of water, or less than 0.1 wt-% of water, if any). Suitable organic solvents include ketones, glycol ethers, esters, alcohols, aromatics, and combinations thereof. Examples of such solvents include cyclohexanone, carbitol, butyl carbitol, butylcellosolve, butanol, methyl isobutyl ketone, methyl isoamyl ketone, methyl amyl ketone, xylene, aromatic 150, aromatic 100, hexylcellosolve, toluene, propylene glycol monomethyl ether acetate, propylene glycol monomethyl ether, dibasic ester, ethyl carbitol, diisobutyl ketone, and mixtures thereof.

The amount of liquid carrier included in a coating composition of the present disclosure is limited only by the desired, or necessary, rheological properties of the composition. Usually, a sufficient amount of liquid carrier is included in the coating composition to provide a composition that can be processed easily and that can be applied to a metal substrate easily and uniformly using a particular application process, and that is sufficiently removed from the coating composition during curing within the desired cure time. In some embodiments, a coating composition typically includes at least 30 wt-% of liquid carrier and more typically at least 40 wt-%, at least 50 wt-% of liquid carrier, or at least 60 wt-% of liquid carrier. Alternatively stated, in some embodiments, a coating composition will typically include no more than 60 wt-% of solids, no more than 50 wt-% of solids, or no more than 45 wt-% of solids. In some embodiments, a coating composition will typically include less than 70 wt-% of liquid carrier, less than 65 wt-% of liquid carrier, or less than 60 wt-% of liquid carrier. Alternatively stated, in some embodiments, a coating composition will typically include at least 30 wt-% of solids, more typically at least 40 wt-% of solids. These weight percentages are based upon the total weight of the coating composition.

In certain embodiments, the coating compositions of the present disclosure are storage stable under normal storage conditions (15° C. to 30° C.) for at least 1 week, at least 1 month, or at least 3 months. In this context, storage stable means that the compositions do not separate into layers or demonstrate significant viscosity variation, there is no crystallization, and/or there is no performance deviation of the resultant cured film.

In certain embodiments, a container coating composition further includes a crosslinking resin. For example, any of the well-known hydroxyl/acid-reactive curing (i.e., crosslinking) resins can be used. In preferred embodiments, the coating composition includes at least one hydroxyl-reactive crosslinker. The choice of particular crosslinker typically depends on the particular product being formulated. Examples of suitable crosslinkers include aminoplasts, phenoplasts, blocked isocyanates, beta-hydroxyalkyl amides, benzoxazines, carbonyl dicaprolactams, oxazolines, and combinations thereof.

Phenoplast resins include the condensation products of aldehydes with phenols. Formaldehyde and acetaldehyde are preferred aldehydes. Various phenols can be employed such as, for example, phenol, cresol, p-phenylphenol, p-tert-butylphenol, p-tert-amylphenol, and cyclopentylphenol, bisphenols, and polyphenols.

Aminoplast resins include, for example, the condensation products of aldehydes such as formaldehyde, acetaldehyde, crotonaldehyde, and benzaldehyde with amino- or amido-group-containing substances such as urea, melamine, and benzoguanamine. Examples of suitable aminoplast resins include benzoguanamine-formaldehyde resins, melamine-formaldehyde resins, esterified melamine-formaldehyde, urea-formaldehyde resins, and combinations thereof.

Condensation products of other amines and amides can also be employed such as, for example, aldehyde condensates of triazines, diazines, triazoles, guanidines, guanamines, and alkyl- and aryl-substituted melamines. Some examples of such compounds are N,N'-dimethyl urea, benzourea, dicyandiamide, formaguanamine, acetoguanamine, glycoluryl, amylin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Examples of suitable isocyanate crosslinkers include blocked or non-blocked aliphatic, cycloaliphatic or aromatic di-, tri-, or poly-valent isocyanates, such as hexamethylene diisocyanate (HMDI), cyclohexyl-1,4-diisocyanate and the like, and mixtures thereof. Examples of generally suitable isocyanates for use in such crosslinkers include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof.

Other suitable crosslinkers include those described in U.S. Pat. Pub. No. 2016/0297994 (Kuo et al.) such as benzoxazine-based phenolic resins, U.S. Pat. Pub. No. 2016/0115347 (Kuo et al.) such as resole curable phenolic resins based on meta-substituted phenol, U.S. Pat. No. 9,598,602 (Kuo et al.) such as a phenolic resin substituted with at least one methylol group, U.S. Pub. No. 2016/0115345 (Kuo et al.) such as a resole phenolic resin containing the residues of an unsubstituted phenol and/or meta-substituted phenol), and U.S. Pat. Pub. No. 2017/0327272 (Chasser et al.) such as a polycarbodiimide. Other suitable crosslinkers include alkanolamide-type curing agents such as beta-hydroxyalkylamide crosslinkers available under the trade names PRIMID XL-552 and PRIMID QM-1260 from EMS-CHEMIE AG.

The level of crosslinker used will depend, for example, on the type of crosslinker, the time and temperature of the bake, and the molecular weight of the polymer. The crosslinker is typically present in an amount of at least 1 wt-%, at least 5 wt-%, at least 10 wt-%, or at least 15 wt-%, based on total resin solids present in the coating composition. In certain embodiments, the crosslinker is present in an amount of up to 40 wt-%, or up to 30 wt-%, or up to 25 wt-%, based on total resin solids present in the coating composition. These weight percentages are based upon the total weight of the resin solids in the coating composition.

In some embodiments, the coating composition of the present disclosure is an organic-solvent-based "gold" coating suitable for use, for example, on the interior of a three-piece food can on the sidewalls and/or can ends (including on the interior surface of a riveted easy open can end). In such embodiments, the coating composition preferably includes a phenoplast crosslinker, more preferably a resole phenolic crosslinker.

In certain embodiments, the container coating compositions (whether aqueous or solvent-based) may include a catalyst to increase the rate of cure and/or the extent of crosslinking of the polyester and make the overall coating a thermoset coating. Nonlimiting examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, tin compounds, titanium compounds, zirconium compounds, zinc compounds, and combinations thereof. Examples include a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt-%, and more preferably at least 0.1 wt-%, based on the weight of nonvolatile material in the coating composition. If used, a catalyst is preferably present in an amount of no greater than 3 wt-%, and more preferably no greater than 1 wt-%, based on the weight of nonvolatile material in the coating composition.

The coating composition of the present disclosure may also include other optional ingredients that do not adversely affect the coating composition or a cured coating resulting therefrom. Such optional ingredients are typically included in a coating composition to enhance composition esthetics, to facilitate manufacturing, processing, handling, and application of the composition, and to further improve a particular functional property of a coating composition or a cured coating resulting therefrom.

Such optional ingredients include, for example, dyes, pigments, toners, extenders, fillers, lubricants, defoamers, anticorrosion agents, flow control agents, thixotropic agents, dispersing agents, antioxidants, adhesion promoters, light stabilizers, and mixtures thereof. Each optional ingredient is included in a sufficient amount to serve its intended purpose, but not in such an amount to adversely affect a coating composition or a cured coating resulting therefrom. The amounts of such additives can be determined readily by one of skill in the art.

A particularly useful optional ingredient is a lubricant, which facilitates manufacture of coated articles (e.g., food or beverage can ends) by imparting lubricity to planar coated metal substrate. A lubricant may be present in the coating composition in an amount of at least 0.1 wt-%, or at least 0.3 wt-%, based on nonvolatile material. A lubricant may be present in the coating composition in an amount of up to 5 wt-%, or up to 3.5 wt-%, based on nonvolatile material. Exemplary lubricants include, for example, Carnauba wax, polyethylene- and polypropylene-type lubricants, polytetrafluoroethylene (PTFE)-modified polyethylene lubricants, and Fisher-Tropsch lubricants.

Another particularly useful optional ingredient is a pigment such as, for example, inorganic pigments like titanium dioxide. Titanium dioxide is a preferred pigment for us in formulating white food can coating composition embodiments of the present disclosure. For pigmented embodiments such as, for example, interior white hard-to-hold food can coating compositions, pigment (e.g., an inorganic pigment such as titanium dioxide) is typically present in the coating composition in an amount of at least about 10 wt-%, at least about 20 wt-%, at least about 30 wt-%, or at least about 40 wt-% based on the total solids of the coating composition. For pigmented embodiments such as, for example, interior white hard-to-hold food can coating compositions, pigment (e.g., an inorganic pigment such as titanium dioxide) is typically present in the coating composition in an amount of no greater than about 70 wt-%, no greater than about 60 wt-%, no greater than about 50 wt-%, or no greater than 45 wt-%, based on the total solids weight of the coating composition.

In some embodiments, the coating composition of the present disclosure is an organic-solvent-based "white" coating composition for as an interior coating composition on the sidewalls and/or ends of a three-piece food can.

The coating compositions of the present disclosure can exhibit any suitable viscosity. Preferably, the coating composition has a viscosity of up to 150 seconds, up to 125 seconds, up to 100 seconds, or up to 95 seconds, or up to 85 seconds (ISO Cup number 6 at 25° C.). While not intending to be bound by theory, it may be advantageous in the case of gold 3-piece food can coating compositions to use a lower relative viscosity (e.g., about 50-75 seconds, more preferably about 55-65 seconds per ISO Cup number 6 at 25° C.) than for a white 3-piece food can coating compositions (e.g., about 95-100 seconds per ISO Cup number 6 at 25° C.).

The coating composition can exhibit any suitable amount of total coating solids. In preferred embodiments, the coating composition includes at least about 25 wt-%, at least about 30 wt-%, at least about 35 wt-%, or at least about 40 wt-% of total coating solids. Typically, the coating compositions will include up to about 70 wt-%, up to about 60 wt-%, or up to about 55 wt-% of total coating solids.

In certain preferred embodiments in which the coating composition is a solvent-based "gold" interior food can coating composition, the coating composition includes more than 35 wt-% of solids, more preferably more than 40 wt-% of solids while still exhibiting a viscosity of less than 80 seconds, more preferably less than 75 seconds, and even more preferably less than 65 seconds (ISO 6 at 25° C.). While not intending to be bound by theory, such a balance of suitably high coating solids and suitably low viscosity cannot be achieved in a gold coating composition using certain conventional polyester polymers such as DYNAPOL L912 from Evonik.

As used herein, a bisphenol compound refers to a polyhydric polyphenol having two phenylene groups (i.e., a six-carbon atom aryl ring having any substituent groups including hydrogen atoms, halogens, hydroxyl groups, etc.) that each include six-carbon rings and a hydroxy (—OH) group attached to a carbon atom of the ring, wherein the rings of the two phenylene groups do not share any atoms in common. As used herein, "structural units derived therefrom" includes diepoxide groups of bisphenols, such as in BADGE (Bisphenol A diglycidyl ether).

In certain embodiments, the container coating compositions of the present disclosure are substantially free of each of bisphenol A, bisphenol F, and bisphenol S, as well as structural units derived therefrom. Preferably, the container coating compositions are substantially free of structural units derived from all bisphenol compounds (including non-estrogenic bisphenol compounds), as well as structural units derived therefrom. As used herein, the term "substantially free" means that the container coating compositions of the present disclosure contain less than 1000 parts per million (ppm), if any, of each of bisphenol A, bisphenol F, and bisphenol S, as well as structural units derived therefrom (in total), or preferably of all bisphenol compounds, as well as structural units derived therefrom (in total).

In certain embodiments, the container coating compositions are essentially free of each of bisphenol A, bisphenol F, and bisphenol S, as well as structural units derived therefrom. In certain preferred embodiments, the container coating compositions are essentially free of all bisphenol compounds (including non-estrogenic bisphenol compounds), as well as structural units derived therefrom. As used herein, the term "essentially free" means that the container coating compositions of the present disclosure contain than 100 ppm, if any, of each of bisphenol A, bisphenol F, and bisphenol S, as well as structural units derived therefrom (in total), or preferably of all bisphenol compounds, as well as structural units derived therefrom (in total).

In certain embodiments, the container coating compositions are essentially completely free of each of bisphenol A, bisphenol F, and bisphenol S, as well as structural units derived therefrom. In certain preferred embodiments, the container coating compositions are essentially completely free of all bisphenol compounds (including non-estrogenic bisphenol compounds), as well as structural units derived therefrom. As used herein, the term "essentially completely free" means that the container coating compositions of the present disclosure contain less than 5 ppm, if any, of each of bisphenol A, bisphenol F, and bisphenol S, as well as structural units derived therefrom (in total), or preferably of all bisphenol compounds, as well as structural units derived therefrom (in total).

In certain embodiments, the container coating compositions are completely free of each of bisphenol A, bisphenol F, and bisphenol S, as well as structural units derived therefrom. In certain preferred embodiments, the container coating compositions are completely free of all bisphenol compounds (including non-estrogenic bisphenol compounds), as well as structural units derived therefrom. As used herein, the term "completely free" means that the container coating compositions of the present disclosure contain less than 20 parts per billion (ppb), if any, of each of bisphenol A, bisphenol F, and bisphenol S, as well as structural units derived therefrom (in total), or preferably of all bisphenol compounds, as well as structural units derived therefrom (in total).

Coating compositions of the present disclosure may be prepared by conventional methods in various ways. For example, the coating compositions may be prepared by simply admixing the polyester, crosslinker and any other optional ingredients, in any desired order, with sufficient agitation. The resulting mixture may be admixed until all the composition ingredients are substantially homogeneously blended. Alternatively, the coating compositions may be prepared as a liquid solution or dispersion by admixing an optional carrier liquid, polyester, crosslinker, and any other optional ingredients, in any desired order, with sufficient agitation. An additional amount of carrier liquid may be added to the coating compositions to adjust the amount of nonvolatile material in the coating composition to a desired level.

Use of coating compositions of the present disclosure include: providing a coating composition as described herein; applying the coating composition to at least a portion of a metal substrate prior to or after forming the metal substrate into a food or beverage container (e.g., a can) or portion thereof; and thermally curing the coating composition.

In certain embodiments of such methods, the metal substrate includes a steel or aluminum substrate. In certain embodiments of such methods, the coating composition is applied to a preformed food or beverage container or a portion thereof. That is, in certain embodiments, the metal substrate is in the form of a preformed food or beverage can having a sidewall and a bottom end, and spraying comprises spraying an interior surface of the sidewall and bottom end.

In certain embodiments of such methods, the coating composition is applied to a food-contact surface of the metal substrate (e.g., an interior side of a food can or a surface that will become an interior side of a food can). Thus, methods of the present disclosure can involve applying the coating composition to a flat substrate, and then forming the flat metal substrate into at least a portion of a container (e.g., food or beverage can) after thermally curing the coating composition.

The coating compositions of the present disclosure also have utility as exterior food or beverage can coatings. For example, in some embodiments, the coating composition of the present disclosure is present on both an interior surface and an exterior surface of a food can (e.g., a 3-piece food can).

The disclosed coating compositions may be present as a layer of a mono-layer coating system or as one or more layers of a multi-layer coating system. The coating compositions can be used as a primer coat, an intermediate coat, a top coat, or a combination thereof. The coating thickness of a particular layer and of the overall coating system will vary depending upon the coating material used, the substrate, the coating application method, and the end use for the coated article. In certain embodiments, a coating prepared from a coating composition of the present disclosure, particularly if an inside container coating, has an average overall coating thickness of at least 1 micron, more typically at least 5 microns, and even more typically at least 10 microns and often up to 20 or even 30 microns.

Mono-layer or multi-layer coating systems including one or more layers formed from the disclosed coating compositions may have any suitable overall coating thickness, and typically are applied, using the mixed units commonly employed in the packaging industry, at coating weights of 1 milligram per square inch ($mg/in^2$ or msi) (i.e., 1.55 gram per square meter ($g/m^2$)) to 20 $mg/in^2$ (i.e., 31 $g/m^2$), and more typically at 1.5 $mg/in^2$ to 10 $mg/in^2$ (i.e., 2.3 $g/m^2$ to 15.5 $g/m^2$). That is, in certain embodiments, the cured coating has an average dry film weight of 1 $mg/in^2$ (i.e., 1.55 $g/m^2$) to 20 $mg/in^2$ (i.e., 31 $g/m^2$). Typically, the cured coating weight for rigid metal containers (e.g., food or beverage cans) are 1 $mg/in^2$ (i.e., 1.55 $g/m^2$) to 6 $mg/in^2$ (i.e., 9.3 $g/m^2$). In certain embodiments in which a coating composition of the present disclosure is used as an interior coating on a drum (e.g., a drum for use with food or beverage products), the coating weight may be approximately 20 $mg/in^2$ (i.e., 31 $g/m^2$).

In certain preferred embodiments, the coating compositions of the present disclosure exhibit excellent cure properties as evidenced, for example, by a high number of MEK double rubs. Preferred coating compositions of the present disclosure, when applied on tin-plate steel can stock substrate and baked for 15 minutes in a 200° C. oven to achieve a cured coating having an average dry film weight of about 15 grams per square meter, exhibit an MEK double rub value in the MEK test described herein of at least about 25, more preferably at about 35, even more preferably at least about 40, even more preferably at least about 60, even more preferably at least about 80, or optimally at least about 100. Preferably, the coating compositions exhibit such MEK double rub resistance values when using a 1,000 gram weight in the test, and more preferably the coating compositions also exhibits such MEK double rub resistance values when using a 2,000 gram weight. While not intending to be bound by theory, it is believed that the high number of MEK double rubs is attributable to one or both of a relatively high hydroxyl number and a high primary hydroxyl group content.

In certain embodiments, cured coatings formed from the coating compositions described herein have a high degree of flexibility, which can be a very useful property in food and beverage cans, for example. Flexibility can be evaluated by the Wedge Bend Test and/or the Porosity Test described in the Examples Section, wherein a coating is applied, e.g., on Electrolytic Tin plate (18/100, 2.8/2.8, TH550) at a dry film weight of 15±1 $g/m^2$ and cured for 15 minutes at 200-205° C. (PMT). A mono-coat coating system is considered to satisfy the Wedge Bend Test if it exhibits a wedge bend percentage of 70% or more, whereas a two-coat coating system is considered to satisfy the test if it exhibits a wedge bend percentage of 85% or more. A coating is considered to satisfy the Porosity Test if it passes an electric current (after end formation) of less than about 10 milliamps (mA) (more preferably less than 5 mA, even more preferably less than 2 mA or less than 1 mA) when tested according to the Porosity Test.

The metal substrate used in forming rigid containers (e.g., food or beverage cans), or portions thereof, typically has a thickness in the range of 125 microns to 635 microns. Electro tinplated steel, cold-rolled steel, and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The disclosed coating compositions may be applied to a substrate either prior to, or after, the substrate is formed into an article such as, for example, a food or beverage container or a portion thereof. In one embodiment, a method of forming food or beverage containers is provided that includes: applying (via spray application, dipping, curtain coating, washing coating, roll coating, etc.) a coating composition described herein to a metal substrate (e.g., applying the composition to the metal substrate in the form of a planar coil or sheet), thermally curing the coating composition, and forming (e.g., via stamping) the substrate into a packaging container or a portion thereof (e.g., a food or beverage can or a portion thereof). For example, two-piece or three-piece food cans or portions thereof such as can ends (including, e.g., riveted easy open food can ends) with a cured coating of the disclosed coating composition on a surface thereof can be formed in such a method.

The disclosed coating compositions are particularly well adapted for use on food cans (e.g., two-piece cans, three-piece cans, etc.). Two-piece cans are manufactured by joining a can body (typically a drawn metal body) with a can end (typically a drawn metal end). The disclosed coatings are suitable for use in food or beverage contact situations and may be used on the inside and/or outside of such cans (e.g., as a continuous inside coating, for example, on the interior can side of a sheet formed into food can end or food can body). They are particularly suitable for use on so-called three-piece food cans and exhibit excellent powder adhesion with the side seam powder compositions frequently used to coat the weld on the sidewall of three-piece food cans, which avoids any corrosion problems at the junction between the coatings of the present disclosure and the cured side seam stripe formed from the side seam powder. Preferred coating compositions of the present disclosure exhibit such excellent powder adhesion, while still exhibiting an excellent balance of other coating properties (e.g., excellent cure, substrate adhesion, corrosion resistance, flexibility, scratch resistance, aesthetic properties, and the like). The disclosed coating compositions also offer utility in other applications.

For any of the application techniques described above, the curing process may be performed in either discrete or combined steps. For example, substrates can be dried at ambient temperature to leave the coating composition in a largely uncrosslinked state. The coated substrates can then be heated to fully cure the compositions. In certain instances, the disclosed coating compositions may be dried and cured in one step. The cure conditions will vary depending upon the method of application and the intended end use.

In certain embodiments, coating composition of the present disclosure is thermally curable. In this context, thermally curable refers to conditions of temperature and time usually used in container coating lines. The thermal curing process may be performed at any suitable temperature, including, for example, oven temperatures in the range of from 170° C. to 230° C., and more typically from 190° C. to 220° C., for a time period of 10 seconds to 30 minutes, more typically for a time period of 30 seconds to 20 minutes, and in some embodiments 10 to 20 minutes. If the substrate to be coated is a metal coil, curing of the applied coating composition may be conducted, for example, by heating the coated metal substrate over a suitable time period to a peak metal temperature ("PMT") of preferably greater than 180° C. More preferably, the coated metal coil is heated for a suitable time period (e.g., 5 to 900 seconds) to a PMT of at least about 200° C. Other commercial coating application and curing methods are also envisioned, for example, electrocoating, extrusion coating, laminating, powder coating, and the like.

EXEMPLARY EMBODIMENTS

Embodiment 1 is a food can coating composition comprising:
- a polyester polymer having:
  - a number average molecular weight (Mn) of preferably less than 10,000,
  - a glass transition temperature (Tg) of more than 60° C.,
  - a hydroxyl value greater than 10 mg KOH/g resin, and
  - optionally a cyclic group, preferably in a backbone of the polyester polymer; and
- a crosslinker, preferably a hydroxyl-reactive crosslinker.

Embodiment 2 is a food can coating composition comprising:
- a polyester polymer having:
  - a number average molecular weight (Mn) of preferably less than 10,000,
  - a glass transition temperature (Tg) of more than 60° C.,
  - a hydroxyl value greater than 10 mg KOH/g resin, and
  - a cyclic group comprising a tricyclic or higher polycyclic group, preferably in a backbone of the polyester polymer, and preferably present in a structural unit derived from a diol; and
- a crosslinker, preferably a hydroxy-reactive crosslinker.

Embodiment 3 is a food can coating composition comprising:
- a polyester polymer having:
  - a glass transition temperature (Tg) of more than 60° C.,
  - a hydroxyl value greater than 10 mg KOH/g resin, wherein more than 50% of the hydroxyl groups present on the polyester polymer are primary hydroxyl groups, and
  - optionally a cyclic group, preferably in a backbone of the polyester polymer; and
- a hydroxyl-reactive crosslinker.

Embodiment 4 is the food can coating composition of embodiments 1 or 3, wherein the polyester polymer includes the cyclic group.

Embodiment 5 is a food can coating composition comprising:
- a polyester polymer having:
  - a glass transition temperature (Tg) of more than 60° C.,
  - optionally a hydroxyl value greater than 10 mg KOH/g resin, wherein preferably more than 50% of the hydroxyl groups present on the polyester polymer are primary hydroxyl groups, and
  - optionally a cyclic group, preferably in a backbone of the polyester polymer, and preferably present in a structural unit derived from a diol; and
- a hydroxyl-reactive crosslinker;
- wherein, the coating composition, when applied on tinplate steel can stock substrate and baked for 15 minutes in a 200° C. oven to achieve a cured coating having an average dry film weight of about 15 grams per square meter, exhibits an MEK double rub value in the MEK test described herein of at least about 25 (using a 1,000 or 2,000 gram weight).

Embodiment 6 is the food can coating composition of any of embodiments 3 to 5, wherein the polyester polymer has a number average molecular weight (Mn) of less than 15,000, preferably less than about 12,000, more preferably less than about 11,000, and even more preferably less than about 10,000.

Embodiment 7 is a method comprising:
- applying the food can coating composition of any of embodiments 1 to 6 to a metal substrate of a food can or portion there; and
- curing the coating composition to form a coating.

Embodiment 8 is a method comprising:
- causing a food can coating composition of any of embodiments 1 to 6 to be disposed on a metal substrate of a food or beverage can or portion thereof to form a coating.

Embodiment 9 is a method of embodiment 7 or 8, wherein the metal substrate comprises a metal sheet (e.g., steel or tinplate steel) for forming the sidewalls of a 3-piece food can or a portion thereof.

Embodiment 10 is a food can or portion thereof comprising:
- a metal substrate, and
- a coating disposed on at least a portion of the substrate formed from the coating composition of any of embodiments 1 to 6.

Embodiment 11 is a food can coating composition, method, or food can or portion thereof of any preceding embodiment, wherein the coating composition is an interior food can coating composition.

Embodiment 12 is a food can coating composition, method, or food can or portion thereof of any preceding embodiment, wherein the polyester polymer has a number average molecular weight (Mn) of less than 10,000, less than 9,500, less than 9,000, less than 8,500, less than 8,000, less than 7,000, less than 6,500, or less than 6,000.

Embodiment 13 is a food can coating composition, method, or food can or portion thereof of any preceding embodiment, wherein the polyester polymer has a number average molecular weight (Mn) of at least at least 2,000, at least 2,500, at least 3,000, at least 3,500, at least 4,000, at least 5,000, at least 6,000, or at least 7,000.

Embodiment 14 is a food can coating composition, method, or food can or portion thereof of any preceding embodiment, wherein the polyester polymer has a number average molecular weight (Mn) of about 2,500 to about 8,000 (or about 4,000 to about 8,000), about 3,500 to about 7,000, or about 4,000 to about 6,600.

Embodiment 15 is a food can coating composition, method, or food can or portion thereof of any preceding embodiment, wherein the polyester polymer has a polydispersity index (PDI) of at least about 1.5, at least about 1.75, at least about 2, or at least about 2.25.

Embodiment 16 is a food can coating composition, method, or food can or portion thereof of any preceding embodiment, wherein the polyester polymer has a polydispersity index (PDI) of no more than about 5, no more than about 4, no more than about 3.5, or no more than about 3.

Embodiment 17 is a food can coating composition, method, or food can or portion thereof of any preceding embodiment, wherein the polyester polymer has a hydroxyl value of at least 11, at least 12, at least 13, at least 14, at least 15, at least 16, at least 17, at least 18, at least 19, at least 20, at least 21, at least 22, at least 23, at least 24, at least 25, at least 26, or at least 27 mg KOH/g resin.

Embodiment 18 is a food can coating composition, method, or food can or portion thereof of any preceding embodiment, wherein the polyester polymer has a hydroxyl value of less than 100, less than 80, less than 60, less than 50, less than 45, less than 40, less than 35, less than 32, less than 30, or less than 29 mg KOH/g resin.

Embodiment 19 is a food can coating composition, method, or food can or portion thereof of any preceding embodiment, wherein the polyester polymer has a hydroxyl value of more than 10 to less than 40 mg KOH/g resin, at least 15 to no more than 35 mg KOH/g resin, or at least 15 to no more than 30 mg KOH/g resin.

Embodiment 20 is a food can coating composition, method, or food can or portion thereof of any preceding embodiment, wherein the polyester polymer has an acid value, if any, of less than 20, less than 10, less than 5, less than 2, or less than 1 mg KOH/g resin.

Embodiment 21 is a food can coating composition, method, or food can or portion thereof of any preceding embodiment, wherein the polyester polymer (prior to any cure of the coating composition) has a Tg of at least about 65° C., at least about 70° C., at least about 75° C., or at least about 80° C.

Embodiment 22 is a food can coating composition, method, or food can or portion thereof of any preceding embodiment, wherein the polyester polymer (prior to any cure of the coating composition) has a Tg of less than about 130° C., less than about 110° C., less than about 100° C., less than about 90° C., or less than about 85° C.

Embodiment 23 is a food can coating composition, method, or food can or portion thereof of any preceding embodiment, wherein the cured coating, or a thermally cured coating formed from the coating composition (e.g., after baking for 15 minutes in a 200° C. oven), has a Tg of at least about 65° C., at least about 70° C., at least about 75° C., at least about 80° C., at least about 85° C., or at least 90° C.

Embodiment 24 is a food can coating composition, method, or food can or portion thereof of any preceding embodiment, wherein the cured coating, or a thermally cured coating formed from the coating composition (e.g., after baking for 15 minutes in a 200° C. oven), has a Tg of less than about 150° C., less than about 130° C., less than about 110° C., less than about 100° C., or less than about 90° C.

Embodiment 25 is a food can coating composition, method, or food can or portion thereof of any preceding embodiment, wherein the polyester polymer includes at least one backbone cyclic group.

Embodiment 26 is a food can coating composition, method, or food can or portion thereof of any preceding embodiment, wherein the polyester polymer includes a plurality of cyclic groups, at least some of which, or all off which, are preferably located in a backbone of the polyester polymer.

Embodiment 27 is a food can coating composition, method, or food can or portion thereof of any of embodiments 1 or 3 to 26, wherein the cyclic group comprises a polycyclic group.

Embodiment 28 is a food can coating composition, method, or food can or portion thereof of any of embodiments 1 or 3 to 27, wherein the polycyclic group comprises a tricyclic or higher group.

Embodiment 29 is a food can coating composition, method, or food can or portion thereof of embodiment 2 or 28, wherein the tricyclic group comprises a tricyclodecane group.

Embodiment 30 is a food can coating composition, method, or food can or portion thereof of embodiment 29, wherein the tricyclodecane group is present in a structural segment derived from tricyclodecanedimethanol.

Embodiment 31 is a food can coating composition, method, or food can or portion thereof of embodiment 27, wherein the polycyclic group comprises a bicyclic group (e.g., a spirocyclic group, a fused bicyclic group, or a bridged bicyclic group).

Embodiment 32 is a food can coating composition, method, or food can or portion thereof of embodiment 31, wherein the bicyclic group comprises one or more of a norbornane group, a norbornene group, an isosorbide group, or a naphthalene group.

Embodiment 33 is a food can coating composition, method, or food can or portion thereof of any of embodiments 27 to 32, wherein the polycyclic group is present in a structural unit provided by a diacid (or an anhydride or alkyl ester of a diacid) or a diol.

Embodiment 34 is a food can coating composition, method, or food can or portion thereof of any of embodiments 31 to 33, wherein the bicyclic group is present in a structural unit derived from isosorbide; nadic acid; a Diels-Alder reaction product of maleic anhydride and dicyclopentadiene; a naphthalene dicarboxylic acid (e.g., 1,4- or 2,6-napthalene dicarboxylic acid); a spirocyclic diol (e.g., 3,9-bis(1,1-dimethyl-2-hydroxyethyl)-2,4,8,10-tetraoxaspiro[5.5]undecane (shown below)), a derivative thereof (e.g., nadic anhydride, methyl nadic acid, or methyl nadic anhydride), or a combination thereof.

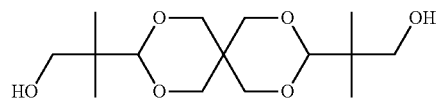

Embodiment 35 is a food can coating composition, method, or food can or portion thereof of any preceding embodiment, wherein the polyester includes a cyclic group comprising a 4-member ring group, and wherein the polyester optionally includes one or more other cyclic groups disclosed herein (e.g., one or more polycyclic groups).

Embodiment 36 is a food can coating composition, method, or food can or portion thereof of embodiment 35, wherein the 4-member ring group comprises a cyclobutane group.

Embodiment 37 is a food can coating composition, method, or food can or portion thereof of embodiment 35 or 36, wherein the 4-member ring group is present in a structural unit derived from a cyclobutane diol, preferably 2,2,4,4-tetramethyl-1,3-cyclobutanediol (shown below).

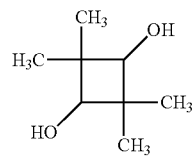

Embodiment 38 is a food can coating composition, method, or food can or portion thereof of any preceding embodiment, wherein the cyclic group is an alicyclic group.

Embodiment 39 is a food can coating composition, method, or food can or portion thereof of any preceding embodiment, wherein the cyclic group is saturated.

Embodiment 40 is a food can coating composition, method, or food can or portion thereof of any preceding embodiment, wherein the cyclic group includes one or more heteroatoms (i.e., atoms other than carbon or hydrogen such as, for example, oxygen or nitrogen).

Embodiment 41 is a food can coating composition, method, or food can or portion thereof of any preceding embodiment, wherein the polyester polymer includes one or more cyclic group comprising a 5-member ring group, and wherein the polyester polymer optionally includes one or more other cyclic groups disclosed herein (e.g., one or more 4-member ring groups, one or more polycyclic groups, or a combination thereof).

Embodiment 42 is a food can coating composition, method, or food can or portion thereof of embodiment 41, wherein the 5-member ring group is present in a structural unit derived from furandicarboxylic acid (e.g., 2,5-furandicarboxylic acid) or a derivative thereof (e.g., an alkyl ester or anhydride derivative thereof).

Embodiment 43 is a food can coating composition, method, or food can or portion thereof of any preceding embodiment, wherein the polyester polymer is formed from reactants including: (i) one or more polyacid (preferably a diacid), anhydride, or alkyl ester thereof and (ii) one or more polyol (preferably a diol).

Embodiment 44 is a food can coating composition, method, or food can or portion thereof of embodiment 43, wherein the reactants include one or more reactants (i) including an aromatic group.

Embodiment 45 is a food can coating composition, method, or food can or portion thereof of embodiment 44, wherein the reactants include phthalic acid, terephthalic acid, isophthalic acid, a derivative thereof (e.g., an anhydride or alkyl ester thereof), or a mixture thereof.

Embodiment 46 is a food can coating composition, method, or food can or portion thereof of any of embodiments 43 to 45, wherein the one or more reactants (ii) comprise a C4 or higher aliphatic diol including a linear carbon chain that is at least four carbons in length (e.g., 1,4-butanediol, 1,6-hexanediol, or a mixture thereof), preferably a C5 or higher aliphatic diol including a linear carbon chain that is at least five carbons in length, and even more preferably a C6 or higher aliphatic diol including a linear carbon chain that is at least six carbons in length; tricyclodecanedimethanol; or a mixture thereof.

Embodiment 47 is a food can coating composition, method, or food can or portion thereof of embodiment 46, wherein the one or more reactants include both tricyclodecanedimethanol and 1,6-hexanediol in any suitable ratio.

Embodiment 48 is a food can coating composition, method, or food can or portion thereof of any preceding embodiment, wherein a polyol reactant is included in the reactants used to make the polyester polymer, and wherein at least 25 wt-%, at least 50 wt-%, at least 60 wt-%, at least 70 wt-%, at least 80 wt-%, at least 90 wt-%, or up to about 100 wt-% of the total polyol reactants used to make the polyester polymer are cyclic-group-containing polyols (e.g., polyols including any of the cyclic groups recited herein).

Embodiment 49 is a food can coating composition, method, or food can or portion thereof of embodiment 48, wherein the cyclic-group-containing polyol comprises tricyclodecanedimethanol.

Embodiment 50 is a food can coating composition, method, or food can or portion thereof of any preceding embodiment, wherein at least 50 mole percent (mol-%), at least 60 mol-%, at least 70 mol-%, at least 80 mol-%, at least 95 mol-%, at least 99 mol-%, or up to 100 mol-% of the one or more polyols used to form the polyester polymer are polyols having primary hydroxyl groups, more preferably polyols that only include primary hydroxyl groups (i.e., no secondary or tertiary hydroxyl groups), even more preferably diols having two primary hydroxyl groups.

Embodiment 51 is a food can coating composition, method, or food can or portion thereof of any preceding embodiment, wherein at least 50%, at least 60%, at least 70%, at least 80%, at least 90%, or up to 100% of the hydroxyl groups present on the polyester polymer are primary hydroxyl groups.

Embodiment 52 is a food can coating composition of any preceding embodiment, wherein a backbone of the polyester polymer is terminated on each end with a hydroxyl group, and wherein at least one, and preferably both, of the hydroxyl groups are primary hydroxyl groups.

Embodiment 53 is a food can coating composition, method, or food can or portion thereof of any preceding embodiment, wherein the reactants used to form the polyester polymer include a C5 or higher aliphatic diol.

Embodiment 54 is a food can coating composition, method, or food can or portion thereof of any preceding embodiment, wherein the C5 or higher aliphatic diol includes a carbon chain that is at least four carbons in length, more typically at least five carbons in length, with an alcohol group attached at each end.

Embodiment 55 is a food can coating composition, method, or food can or portion thereof of any preceding embodiment, wherein the C5 or higher aliphatic diol comprises 1,6-hexanediol.

Embodiment 56 is a food can coating composition, method, or food can or portion thereof of any of embodiments 53 to 55, wherein the polyester polymer includes at least 1 wt-%, at least 2 wt-%, at least 3 wt-%, or at least 4 wt-% of the C5 or higher aliphatic diol (e.g., 1,6-hexanediol), based on the total weight of reactants used to form the polyester polymer.

Embodiment 57 is a food can coating composition, method or food can or portion thereof of any preceding embodiment, wherein the polyester polymer includes less than 4 wt-%, less than 3 wt-%, less than 1 wt-%, less than 0.5 wt-%, or less than 0.1 wt-%, if any, of 1,4-butanediol, based on the total weight of reactants used to form the polyester polymer.

Embodiment 58 is a food can coating composition, method or food can or portion thereof of any preceding embodiment, wherein the coating composition is a solvent-based coating composition that preferably includes less than 2 wt-% of water, if any.

Embodiment 59 is a food can coating composition, method or food can or portion thereof of any preceding embodiment, wherein the coating composition, based on total resin solids, includes at least 40 wt-%, at least 50 wt-%, at least 60 wt-%, at least 70 wt-%, at least 80 wt-%, or at least 90 wt-% of the polyester polymer.

Embodiment 60 is a food can coating composition, method or food can or portion thereof of any preceding embodiment, wherein the coating composition, based on total solids, includes at least 30 wt-%, at least 40 wt-%, at least 50 wt-%, or at least 60 wt-% of the polyester polymer.

Embodiment 61 is a food can coating composition, method or food can or portion thereof of any preceding embodiment, wherein the coating composition, on total resin solids, includes at least 1 wt-%, at least 5 wt-%, at least 10 wt-%, or at least 15 wt-% of crosslinker.

Embodiment 62 is a food can coating composition, method or food can or portion thereof of any preceding embodiment, wherein the crosslinker comprises a hydroxyl-reactive crosslinker.

Embodiment 63 is a food can coating composition, method or food can or portion thereof of any preceding embodiment, wherein the crosslinker comprises a phenoplast crosslinker (preferably a resole phenolic crosslinker), a blocked isocyanate crosslinker, an aminoplast crosslinker (e.g., benzoguanamine-formaldehyde, melamine-formaldehyde, urea formaldehyde, or the like), or a combination thereof.

Embodiment 64 is a food can coating composition, method or food can or portion thereof of any preceding embodiment, wherein the coating composition includes a pigment (e.g., an inorganic pigment such as titanium dioxide).

Embodiment 65 is a food can coating composition, method or food can or portion thereof of embodiment 64, wherein the pigment (e.g., an inorganic pigment such as titanium dioxide) is present in the coating composition in an amount of at least about 10 wt-%, at least about 20 wt-%, at least about 30 wt-%, or at least about 40 wt-% based on the total solids of the coating composition.

Embodiment 66 is a food can coating composition, method or food can or portion thereof of embodiment 64 or 65, wherein the pigment (e.g., an inorganic pigment such as titanium dioxide) is present in the coating composition in an amount of no greater than about 70% by weight, preferably no greater than about 60% by weight, and even more preferably no greater than about 50% by weight or less than 45% by weight, based on the total solids weight of the coating composition.

Embodiment 67 is a food can coating composition, method or food can or portion thereof of any preceding embodiment, wherein the coating composition has a viscosity of at least 40 seconds, at least 50 seconds, or at least 60 seconds, at least 70 seconds, or at least 90 seconds at 25° C. (ISO Cup number 6).

Embodiment 68 is a food can coating composition, method or food can or portion thereof of any preceding embodiment, wherein the coating composition has a viscosity of up to 150 seconds, up to 125 seconds, up to 100 seconds, or up to 95 seconds, or up to 85 seconds at 25° C. (ISO Cup number 6).

Embodiment 69 is a food can coating composition, method or food can or portion thereof of any preceding embodiment, wherein the coating composition is a solvent-based, white three-piece food can coating composition.

Embodiment 70 is a food can coating composition, method or food can or portion thereof of any preceding embodiment, wherein the coating composition is a solvent-based, gold three-piece food can coating composition that preferably includes a phenoplast crosslinker, more preferably a resole phenolic crosslinker.

Embodiment 71 is a food can coating composition, method or food can or portion thereof of any preceding embodiment, wherein the polyester polymer does not include any structural segments derived from bisphenol A, bisphenol F, bisphenol S, or any derivatives thereof (e.g., the diglycidyl ether of bisphenol A, the diglycidyl ether of bisphenol F, or the diglycidyl ether of bisphenol S).

Embodiment 72 is a food can coating composition, method or food can or portion thereof of any preceding embodiment wherein halogenated materials (e.g., PVC or vinyl chloride) are not used to make the coating composition, although trace detectable amounts may still be present due to, e.g., environmental contamination.

Embodiment 73 is a food can coating composition, method or food can or portion thereof of any preceding embodiment, wherein the coating composition includes at least about 25 wt-%, at least about 30 wt-%, or at least about 35 wt-% of total coating solids.

Embodiment 74 is a food can coating composition, method or food can or portion thereof of any preceding embodiment, wherein the coating composition includes up to about 70 wt-%, up to about 60 wt-%, or up to about 55 wt-% of total coating solids.

Embodiment 75 is a food can coating composition, method or food can or portion thereof of any preceding embodiment, wherein the coating composition includes at least one, preferably at least two, or more preferably all of: a silicone-containing surface additive that reduces surface tension (preferably a solution of a polyester-modified polydimethylsiloxane), a defoamer (preferably a solution of foam-destroying polymers and polysiloxanes), and a wax dispersion (preferably a wax dispersion having (i) a melting range of about 87 to 93° C., via DSC (solid wax) (ISO 11357-3) and/or (ii) a D50 particle size of about 2 to 3 microns and a D98 particle size of about 5 microns or lower, each Picture-Particle-Analyzing System).

Embodiment 76 is a food can coating composition, method or food can or portion thereof of any preceding embodiment, wherein the coating composition, when applied on tin-plate steel can stock substrate and baked for 15 minutes in a 200° C. oven to achieve a cured coating having an average dry film weight of about 15 grams per square meter, exhibits an MEK double rub value in the MEK test described herein (using a 1,000 gram weight) of at least about 35, at least about 40, at least about 60, at least about 80, or at least about 100. Preferably, the coating composition also exhibits such MEK double rub values when using a 2,000 gram weight.

Embodiment 77 is a food can coating composition, method or food can or portion thereof of any preceding embodiment, wherein the polyester polymer includes at least about 20% by weight, more preferably at least about 30% by weight, or even more preferably at least about 40% by weight of structural units derived from a tricyclic-group-containing diol (preferably tricyclodecanedimethanol), based on the total weight of reactants used to form the polyester polymer.

Embodiment 78 is a food can coating composition, method or food can or portion thereof of any preceding embodiment, wherein the polyester polymer includes less than 70 wt-%, more preferably less than 65 wt-%, or even more preferably less than 60 wt-% of structural units derived from a tricyclic-group-containing diol (preferably tricyclodecanedimethanol), based on the total weight of reactants used to form the polyester polymer.

Embodiment 79 is a food can coating composition, method or food can or portion thereof of any preceding embodiment, wherein the coating composition, when applied on tin-plate steel can stock substrate and baked for 15 minutes in a 200° C. oven to achieve a cured coating having an average dry film weight of about 15 grams per square meter, exhibits a wedge bend of at least 70%, at least 80%, at least 85%, or at least 90%.

Embodiment 80 is the polyester polymer of any preceding embodiment.

Test Methods

Unless indicated otherwise, the following test methods may be utilized.

Differential Scanning Calorimetry for Tg

Samples for differential scanning calorimetry ("DSC") testing are prepared by first applying the liquid resin composition (e.g., a polyester polymer of the present disclosure in solvent) onto aluminum sheet panels. The panels are then baked in a Fisher Isotemp electric oven for 20 minutes at 300° F. (149° C.) to remove volatile materials. After cooling to room temperature, the samples are scraped from the panels, weighed into standard sample pans, and analyzed using the standard DSC heat-cool-heat method. The samples are equilibrated at −60° C., then heated at 20° C. per minute to 200° C., cooled to −60° C., and then heated again at 20° C. per minute to 200° C. Glass transition temperatures are calculated from the thermogram of the last heat cycle. The glass transition is measured at the inflection point of the transition.

When measuring the Tg for cured coatings, the DSC can be run in an analogous manner but skipping the removal of volatiles steps.

Viscosity (Iso 6 at 25° C.) of Coating Composition

Viscosities of coating compositions were measured according to ASTM D 1200 using Iso cup No. 6 (a European standard).

Hydroxyl Number of Polyester Resin

The following test provides a method for quantitative determination of hydroxyl content in polyester polymers. Using this method, the acid value of the material must be known or measured to calculate the hydroxyl value.

The following is a listing of equipment needed for the test: analytical balance—reading to fourth decimal place; auto-titrator (preferred), such as a Metrohm Titrino, or a 50 mL burette graduated in 0.1 mL increments; Erlenmeyer flasks—250 mL; graduated cylinders—25 mL, or (preferred) bottle-top plunge dispensers; volumetric pipette—15 mL; and magnetic stirrer with Teflon stir-bars.

The following is a listing of reagents needed for the test:

Dimethylformamide (DMF); certified A.C.S. grade or equivalent.

Methylene chloride; HPLC grade or equivalent.

Tetrahydrofuran (THF); HPLC grade or equivalent.

Acetylating agent: Combine 44 g of acetic anhydride (97%) with 500 g of DMF and homogenize. Store in a dedicated airtight vessel labeled with the date prepared.

Catalyst solution: Dissolve 5 g of 4-(dimethylamino) pyridine (DMAP) in 500 mL of DMF. Store in a dedicated airtight vessel labeled with the date prepared.

Hydrolysis agent: Mix 4 parts by weight DMF with 1 part by weight deionized water. Store in a dedicated airtight vessel labeled with the date prepared.

0.5N methanolic KOH standardized solution.

Phenolphthalein indicator: Mix 1 g of phenolphthalein with 100 g of absolute ethanol.

Xylenes; laboratory grade or equivalent.

1-Decanol

Below is the testing procedure:

A. All flasks should be clean. Of importance is the precise volumetric addition of the acetylating agent. When stirring samples try to avoid excess splashing onto flask walls.

B. Blank titrations must be run in triplicate the same day as the sample titrations. Follow steps E thru K for the blank runs, and the average (in mL) of the three titrations (B) is used in the hydroxyl number calculation.

C. Accurately weigh resin sample into a clean Erlenmeyer flask using the table below as a guide. Record mass (M) to the nearest 0.001 g. Repeat if running in duplicate (preferred). Take care not to drip any sample onto flask walls.

| EXPECTED OH# | WEIGHT OF SAMPLE SOLIDS |
| --- | --- |
| <15 | 10 g |
| 15-30 | 6 g |
| 30-50 | 4 g |
| 100-200 | 1.2 g |
| >300 | 0.8 g |

D. Add 25 mL of THF to the flask and dissolve sample on a stir plate with a stir bar. (OPTIONAL): 10-15 mL of Xylenes may be used, instead, if the sample is highly viscous/solid and does not homogenize with THF addition.

E. Add 25 mL of methylene chloride to the flask and stir to homogenize.

F. Add 25 mL of catalyst solution and stir to homogenize.

G. Precisely add 15 mL of acetylating agent using a volumetric pipette and stir sample for 15-20 minutes.

H. Carefully add 20 mL of hydrolysis agent and stir for 15-20 minutes. This addition should be made while stirring or gently swirling the flask to avoid excessive precipitation of polyester samples.

I. Add 25 mL of THF and stir to homogenize.

J. Add 8 drops of phenolphthalein indicator to the stirring sample.

K. Titrate the sample with standardized 0.5N KOH solution to a pink end point. Record the total volume in mL (A) required to titrate the sample.

L. 1-Decanol should be run as a standard to validate the method. The theoretical hydroxyl number for 1-decanol is 355.

The following formula is used to calculate the hydroxyl number for each sample:

$$OH\# = \frac{[(B-A)(N)(56.1)]}{(M)(\% \ NV)} + AV$$

A=Volume of KOH in mL required to titrate sample

B=Volume of KOH in mL required to titrate blanks (averaged)

N=Normality of KOH solution (0.5)

M=Mass of sample in grams

% NV=Percent solids of sample (decimal)

AV=Measured acid value of sample

Hydroxyl numbers should be calculated individually for each sample and then averaged for all replicates. Report as whole number average value (Delta Value)+acid value. The reproducibility and reliability of this procedure is generally expected to be accurate to within ±5%.

Acid Number of Polyester Resins

The following test provides a method for quantitative determination of acid number, which is defined as the milligrams of potassium hydroxide required to neutralize one gram of sample solids.

The following is a listing of equipment needed for the test: Burette, graduated in tenths of milliliters (ml); analytical balance, accurate to four decimal places; magnetic stirrer/hot plate combination; graduated cylinders; 125 ml. Erlenmeyer flasks, standard taper 24/40; condenser, standard taper 24/40; 100 ml. volumetric flasks; assorted pipettes; and Teflon stirring bars.

The following is a listing of reagents needed for the test:

1.0 Normal ("N") sodium hydroxide, standardized. Fisher Scientific Co., catalog number SS 266-1.

0.1 N Alcoholic Potassium Hydroxide, Standardized. Fisher Scientific Co., catalog number SP-224-TM-4B, Dimethyl Formamide.

TK-12A, Methyl Ethyl Ketone.

Thymol blue pH indicator. Fisher Scientific Co., catalog number T416-5.

Cresol red pH indicator. Aldrich Chemical, catalog number 11,447-2

Below is the testing procedure:

A. DMF/MEK Blend.

Mix by volume 60 parts DMF with 40 parts MEK, using graduated cylinders. A quantity of this material may be mixed and stored in an amber bottle. The blank should be run with each sample.

B. Mixed Thymol Blue/Cresol Red Indicator.
1. To make 0.02 N NaOH, pipette 2 ml. 1.0 N aqueous NaOH into a 100 ml. volumetric flask and dilute with distilled water.
2. In a 100 ml. Volumetric flask dissolve 0.100 gram Thymol blue pH indicator in 10.75 ml. 0.02 N NaOH and dilute to 100 ml. with distilled water.
3. In a 100 ml. volumetric flask dissolve 0.100 gram Cresol Red pH indicator in 13.1 ml. 0.02 N NaOH and dilute to 100 ml. with distilled water.
4. Mix 95 ml. of the Thymol Blue solution and 5 ml. of the Cresol Red solution to obtain the mixed indicator solution.

C. Into a 125 ml. flask weigh a sample of the material to be tested accurate to four decimal places. Add 50 ml. of the DMF/MEK blend and a Teflon stirring bar. Place the flask on the hot plate/stirrer combination, attach the condenser and dissolve the sample with heat and stirring. When the sample is completely dissolved, remove from the hot plate and cool to room temperature.

D. Add only 2 drops of the mixed indicator. Excess indicator may give a false endpoint. Titrate with the 0.1 N KOH to a blue endpoint leaving no trace of green present. Titrate a blank using the same procedure omitting the sample. The blank should be heated the same amount of time as the sample.

The acid number is calculated using the following formula:

$$\text{Acid Number} = \frac{(A - B) \times N \times 56.1}{W \times S}$$

Where:
A=ml. KOH required for sample
B=ml. KOH required for the blank
N=Normality of the KOH solution
W=Weight of the sample in grams
S=Solids expressed as a decimal (% solids/100)
The acid number is reported to three significant figures.

MEK Solvent Resistance of Coating

The extent of "cure" or crosslinking of a coating is measured as a resistance to solvents, such as methyl ethyl ketone (MEK). The following equipment is used: an Abrasimeter (e.g., from FRAMCO), a new felt pad, and neat MEK solvent. The sample for evaluation is a coated metal plate (e.g., tin-plate steel can stock) of 12 cm by 5 cm. The procedure is as follows:

Adapt the abrasimeter by attaching the buffer holder.
Set the abrasimeter double rubs counter to zero.
Lay the panel coated with the product to be tested on the abrasimeter support.
Install the weight (a 1,000 gram weight for a "gold" such as, e.g., Example 4 or a 2,000 gram weight for a "white" such as, e.g., Example 3) on the abrasimeter arm.
Soak a new felt pad with the MEK solvent and place it in the test stand.
Lower the abrasimeter arm and immediately switch on the double rubs counter.
Stop the double rubs counter as soon as the bare metal appears, which is the number of double rubs (i.e., one back-and-forth motion) that is reported.

Wedge Bend Test of Coating

This test provides an indication of a level of flexibility of a coating and an extent of cure. An ERICHSEN model 471 bend and impact tester is used. Coated rectangular tin-plate steel test sheets are used (typically 0.2 millimeter metal thickness as the thickness of the metal can affect the result), which measure 12 cm long by 5 cm wide, with the 12 cm dimension parallel to the substrate rolling direction. Test wedges are formed from the coated sheets by folding (i.e., bending) the sheets around a mandrel. To accomplish this, the mandrel (present on the left of the bend and impact tester) is positioned on the coated sheets so that it is oriented parallel to, and equidistant from, the 12 cm edges of the sheets. The resulting test wedges have a 6-mm wedge diameter and a length of 12 cm. To assess the wedge bend properties of the coatings, the test wedges are positioned lengthwise in a metal block of a wedge bend tester and a 2.3 kg weight is dropped onto the test wedges from a height of 65 cm.

The deformed test wedges are then immersed for five minutes in a copper sulphate test solution, which is prepared by combining 16.3 grams of copper sulfate, 82 grams of tap water, 0.5 grams of hydrochloric acid, and 1.2 grams of sodium hydroxide. The exposed metal is examined under a microscope and the millimeters of coating failure along the deformation axis of the test wedges is measured. The data is expressed as a wedge bend percentage using the following calculation: 100%×[(120 mm)−(mm of failure)]/(120 mm).

Preferred cured coatings of the present disclosure, exhibit a wedge bend of at least 70%, more preferably at least 80%, and even more preferably at least 90%.

Porosity Test of Coating

This test provides an indication of the level of flexibility of a coating. Moreover, this test measures the ability of a coating to retain its integrity as it undergoes the formation process necessary to produce a food or beverage can end. In particular, it is a measure of the presence or absence of cracks or fractures in the formed can end.

The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, standard profile 3-piece tin-plate steel food can ends (73 mm diameter) are stamped from coated tinplate steel having the coating to be tested located on the internal side of the sheet.

A test solution is prepared from the following ingredients: 800 grams of deionized water, 4 grams of sodium chloride, 8 grams of potassium ferricyanide (CAS NO 13746-66-2), and 1 gram of AEROSOL OT 75 surfactant. A PRECODER 2A porosimeter is used for the evaluation. The porosimeter cell is filled to an appropriate height with the test solution and the formed can end is placed on the porosimeter jar with the coating facing down. A vacuum system linked to the porosimeter is turned on so that the can end sticks on the cell. The porosimeter cell with the can end is then inverted and the electrical current passage, in milliamps, through the coating is measured after four seconds of applied current passing through the coating. This measured current passage is the porosity value.

A coating is considered herein to satisfy the Porosity Test if it passes an electric current (after end formation) of less than about 10 milliamps (mA) when tested as described above, more preferably less than 5 mA, even more preferably less than 2 mA.

EXAMPLES

These Examples are merely for illustrative purposes and are not meant to be overly limiting on the scope of the appended embodiments. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the embodiments, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Missouri, or may be synthesized by conventional methods.

TABLE 1

Examples 1-2: Polyester Synthesis

| Ingredients | Example 1 Kilograms (kg) | Wt-% | Example 2 Kilograms (kg) | Wt-% |
| --- | --- | --- | --- | --- |
| Tricyclodecane dimethanol (TCDM) | 1495 | 27.29 | 1386 | 25.68 |
| 1,6-hexanediol | 169 | 3.09 | 275 | 5.09 |
| Terephthalic acid (TPA) | 1434 | 26.18 | 1448 | 26.83 |
| FASCAT 9102/DBTL catalyst | 3.1 | 0.06 | 3.81 | 0.07 |
| Solvesso 100 | 2202 | 40.20 | 2107 | 39.03 |
| Xylene | 175 | 3.19 | 178 | 3.30 |
| Total | 5478.1 | 100.00 | 5397.81 | 100.00 |
| In-process specifications | | | | |
| Acid Number (mg KOH/g) | <2 | | <2 | |
| Noury Viscosity (55% solution in Xylene) | 50-60 P | | 24-28 P | |
| Final specifications | | | | |
| Hydroxyl Number (mg KOH/g) | 18 | | 26 | |
| Acid Number (mg KOH/g) | <2 | | <2 | |
| Solid Content (1 g resin/30 min./180° C.) | 53-55% | | 54-56% | |
| Mn (GPC) | 6,000-6500 | | 4,500-5,000 | |

The below process is a suitable process for making the polyesters of Examples 1 and 2, using the ingredient amounts shown above in Table 1. The measured Tg, hydroxyl number, acid number, solids content, and Mn for each of the resulting polyesters are reported above in Table 1 under "Final Specifications".

In a round bottom stainless steel or glass reactor equipped with Nitrogen flow, a packed distillation column and a decanter, TCDM and 1,6 hexanediol are added and heated to 100 to 110° C. At 100 to 110° C., terephthalic acid, catalyst (DBTL/Fascat 9102) are added and then the reaction mixture is heated to 210° C. When the reaction mixture is at 210° C., hold for 60 min at 210° C. At the end of hold, start heating the reaction mixture to a 245 to 250° C. maximum temperature until distillation finishes and the resin is clear. When the resin is clear, cool it down to 180° C. and add Solvesso 100 (nonvolatile content, NVC=93%) for azeotropic phase. Heat it up until reflux circulation is established and remove water until the resin is within the in-process specifications with an acid number of less than 2 and a Viscosity value as defined in Table 1. When the resin is within specification, cool it down to 190° C. and add Solvesso 100 and Xylene for final dilution to 53-55% solids for Example 1 and 54-56% solids for Example 2.

Example 3: Preparation of a "Hard-to-Hold" White Food Can Coating Composition

An organic-solvent-based, hart-to-hold ("HTH") white food can coating composition was prepared using the polyester of Example 2. A comparative white HTH food can coating composition (Comparative Example A) was prepared using the same method and formulation, but replacing the Example 2 polyester with an equivalent amount (on solids) of Uralac SH 992-S145 polyester commercially available from DSM. The ingredients used to formulate the Example 3 coating composition and the Comparative Example A coating composition are provided below in Table 2.

A kilogram of the white coating compositions of Example 3 and Comparative Example A can be prepared using the following method. In a round tinplate can, add the first quantity of polyester resin (i.e. components 1 or 2 respectively in Table 2). The can is then placed under a stirrer quipped with a round blade for high speed dispersion. The TiO2 (component 3) is added under stirring at 1,850 turns per minute. When the TiO2 is fully incorporated, the mixing speed is increased to 2,300 turns per minute and the can is covered to avoid the solvent evaporation. When the temperature of the mixture is at 80° C., the stirring is discontinued. The gauge is then measured to verify if the TiO2 is well dispersed (North Gauge needs to be >9). Wait until the dispersion temperature is below 40° C. (possibility to cool the dispersion in cold water). In the can containing the TiO2 dispersion, add each remaining raw material in Table 2 according to the recipe quantity and stir manually with a spatula between each component addition. When all the ingredients are added, put the white coating composition under stirring for 5 minutes at 1,850 turns per minute. When the product is defoamed, measure the viscosity and if it necessary, add some solvent according to the coating recipe to adjust the viscosity.

TABLE 2

| | Ingredient | Example 3 HTH Coating Composition (weight parts) | Comparative Example A White HTH Coating Composition (weight parts) |
| --- | --- | --- | --- |
| 1 | Example 2 polyester resin | 25.02 | — |
| 2 | URALAC SH 992-S145 polyester* | — | 10.94 |
| 3 | KRONOS 2064 titanium dioxide | 25.02 | 25.53 |
| 4 | Example 2 polyester resin | 24.5 | — |
| 5 | URALAC SH 992-S145 polyester* | — | 41.87 |
| 6 | Solvesso 100 solvent | 0.67 | 0.61 |
| 7 | Diethylene glycol butyl ether | 0.67 | 0.61 |
| 8 | Desmodur BL 2078/2 blocked isocyanate crosslinker | 7.52 | 6.86 |
| 9 | Luba Print 351/G wax dispersion** | 4.72 | 4.3 |
| 10 | BYK-310 silicone-containing surface additive solution*** | 0.1 | 0.09 |
| 11 | BYK-088 defoamer**** | 0.26 | 0.23 |

TABLE 2-continued

| | Example 3 HTH Coating Composition (weight parts) | Comparative Example A White HTH Coating Composition (weight parts) |
|---|---|---|
| 12 Fascat 9102 catalyst | 0.01 | 0.01 |
| 13 Solvesso 100 solvent | 5.755 | 4.47 |
| 14 Diethylene glycol butyl ether | 5.755 | 4.48 |
| Total | 100 | 100 |

*Uralac SH 992-S145 polyester is a TCDM-containing polyester reported in manufacturer's literature to have a number average molecular weight of 10,000, a hydroxyl value of 10, and a Tg of 95° C.
**According to literature from the manufacturer (Munzing Chemie Gmbh) the Luba Print 351/G product is a wax dispersion having a melting range of about 87 to 93° C., via DSC (solid wax) (ISO 11357-3) and a D50 particle size of 2.0 microns (minimum) to 3.0 microns (maximum) and a D98 particle size of 5.0 maximum, each via Picture-Particle-Analyzing System.
***According to literature from the manufacturer (BYK), the BYK-310 product is a solution of a polyester-modified polydimethylsiloxane.
****According to literature from the manufacturer (BYK), the BYK-88 product is a solution of foam-destroying polymers and polysiloxanes The Example 3 and Comparative Example A coating composition where each applied on tin-plate steel can stock (0.2 mm thick) and baked for 15 minutes in a 200° C. oven to achieve cured average dry film weights of about 15 grams per square meter. The cured coatings were evaluated using the coatings performance testing indicated in Table 3.

TABLE 3

| | Example 3 White HTH Coating | Comparative Example A White HTH Coating |
|---|---|---|
| Polyester | Example 2 | Uralac SH 992-S145 polyester |
| Sheen Hardness (gram) | 1100 | 900 |
| MEK resistance (double rubs) | >100 | 26 |
| Porosity before retort (mA) | 0.23 | 0.15 |
| Porosity after retort in 1% lactic acid (mA) | 1.45 | 0.61 |
| Porosity after retort in 3% acetic acid (mA) | 0.82 | 0.85 |

As indicated by the coating performance data in Table 3, the Example 3 coating had porosity values that were roughly equivalent to those of the Comparative Example A coating, while exhibiting improved scratch resistance (as indicated by the improved sheen hardness) and markedly improved crosslinking (as indicated by the MEK double rubs). The data in Table 3 suggests that the polyester of Example 1 having a lower Mn and a higher hydroxyl number than Comparative Example A, exhibited enhanced crosslinking in a white HTH food can coating.

The performance of the polyester of Example 1 in a solvent-based white food can coating similar to that of Example 3 was also compared to a comparable coating composition instead formulated using DYNAPOL L912 polyester (commercially available from Evonik). The coating composition formulated using the polyester of Example 1 exhibited enhanced compatibility relative to the comparable coating composition formulated using DYNAPOL L912 polyester. In particular, unlike when the DYNAPOL L912 polyester was used, the coating composition formulated using the polyester of Example 1 exhibited enhanced solvent latitude and avoided the presence of unsuitable agglomerates, which can lead to pot-life instability problems and pin-holes in the cured can coating.

Example 4: Preparation of "Hard-to-Hold" Gold Food Coating Compositions

An organic-solvent-based, hart-to-hold ("HTH") gold food can coating composition was prepared using the polyester of Example 2. A comparative gold coating composition (Comparative Example B) was prepared using the same method and formulation, but replacing the Example 2 polyester with an equivalent amount (on solids) of Uralac SH 992 polyester-S145. The ingredients used to formulate the Example 4 gold coating composition and the Comparative Example B gold coating composition are provided below in Table 4.

A kilogram of the gold coating compositions of Example 4 and Comparative Example B can be prepared using the following method. In a round tinplate can, add each raw material according to the recipe quantity and stir manually with a spatula between additions. When all the ingredients are added, put the gold coating composition under stirring for 5 minutes at 1,850 turns per minute. When the product is defoamed, measure the viscosity and if it is necessary, add some solvent according to the coating recipe to adjust the viscosity. The target viscosity for gold coating compositions such as that of Example 4 is around 70"±5" (ISO 6 @ 25° C.), the target total solids content is around 43%±2%.

TABLE 4

| | Example 4 Gold coating composition (weight parts) | Comparative Example B gold coating composition (weight parts) |
|---|---|---|
| Polyester example 2 (resin solid: 54.8%) | 58.3 | |
| Uralac 992 S1-45 (resin solid 45%) | | 71.0 |
| Dibasic ester | 3.0 | 3.0 |
| PM Acetate | 3.0 | 3.0 |
| Butanol | 4.25 | 4.25 |
| Plastopal RH - Urea formaldehyde resin | 0.77 | 0.77 |
| Mowital B20H - Polyvinyl butyral | 0.41 | 0.41 |
| Butanol | 3.27 | 3.27 |
| Desmodur VPLS 2078/2 - E caprolactame blocked aliphatic polyisocyanate based on IPDI | 5.52 | 5.52 |
| Durez 37010 - Resol phenolic resin | 3.57 | 3.57 |
| Bakelite PF 6470 LB - Alkylphenol resol etherified | 9.2 | 9.2 |
| DUREZ 33310 - Resol phenolic resin | 3.27 | 3.27 |
| Cycat 600 - Dodecylbenzene sulfonic acid | 0.17 | 0.17 |
| PM Acetate | 0.7 | 0.7 |
| Luba Print 436ND - Synthetic wax dipserion | 2.11 | 2.11 |
| Dibasic ester | 1.23 | 0.26 |
| PM Acetate | 1.23 | 0.26 |
| Viscosity (ISO 6 cup @25° C.) | 71" | 71" |
| Solid content (1 g 30' @200° C.) | 44.40% | 39.80% |

The Example 3 and Comparative Example A coating composition where each applied on tin-plate steel can stock and baked for 15 minutes in a 200° C. oven to achieve cured average dry film weights of about 15 grams per square meter. The cured coating were evaluated using the coatings performance testing indicated in Table 3.

TABLE 5

| | Example 4 Gold Coating | Comparative Example B Gold Coating |
|---|---|---|
| Polyester | Example 2 | Uralac SH 992 polyester** |
| Sheen Hardness (grams) | 1100 | 700-800 |

TABLE 5-continued

|  | Example 4 Gold Coating | Comparative Example B Gold Coating |
|---|---|---|
| MEK Resistance (double rubs) | >100 | 20 |
| Wedge Bend (%) | 90 | 80 |
| Porosity after retort (1 hour at 130° C.) in 3% acetic acid (mA) | 1 | 1.6 |

As shown in the data of Table 5, the Example 4 coating exhibited markedly improved MEK resistance, while also exhibiting improved hardness and flexibility.

Moreover, unlike gold coating compositions formulated using DNAPOL L912 polyester from Evonik (data not shown), the gold coating of Example 4 achieved a high solids content at the indicated viscosity. In contrast, an analogous gold coating formulated using Evonik DYNAPOL L912 polyester that exhibited a comparable viscosity to that of Example 4, exhibited a solid content of about 35%. Thus, to achieve a comparable dry film weight to that of Example 4, appreciably more liquid coating composition would need to be applied, which would substantially drive up cost, irrespective of any coating performance differences.

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A food can coating composition comprising:
   a polyester polymer having:
      a number average molecular weight (Mn) of less than 10,000,
      a glass transition temperature (Tg) of more than 60° C.,
      a hydroxyl value greater than 10 and less than 100 mg KOH/g resin, and
      one or more cyclic groups in a backbone of the polyester polymer, wherein the one or more cyclic groups comprise one or more polycyclic groups and wherein the one or more polycyclic groups comprise one or more tricyclic groups; and
   a hydroxyl-reactive crosslinker.

2. The food can coating composition of claim 1, wherein the polyester polymer has a hydroxyl value of at least 15 to no more than 35 mg KOH g/resin.

3. The food can coating composition of claim 1, wherein the polyester polymer is formed from reactants including: (i) one or more polyacid, anhydride, or alkyl ester thereof and (ii) one or more polyol, wherein at least 50 mole percent (mol-%) of the one or more polyols used to form the polyester polymer comprise a diol having two primary hydroxyl groups.

4. The food can coating composition of claim 3, wherein the one or more polyol includes a C4 or higher aliphatic diol including a linear carbon chain that is at least four carbons in length and a diol including a mono-cyclic group having five ring members or less or a polycyclic group.

5. The food can coating composition of claim 4, wherein the C4 or higher aliphatic diol having a linear chain that is at least four carbons in length comprises 1,6-hexanediol.

6. The food can coating composition of claim 1, wherein the coating composition, when applied on tin-plate steel can stock substrate and baked for 15 minutes in a 200° C. oven to achieve a cured coating having an average dry film weight of about 15 grams per square meter, exhibits an MEK double rub value in the MEK test described herein (using a 1,000 gram weight) of at least about 25, and exhibits a wedge bend of at least 80%.

7. The food can coating composition of claim 2, wherein the coating composition, when applied on tin-plate steel can stock substrate and baked for 15 minutes in a 200° C. oven to achieve a cured coating having an average dry film weight of about 15 grams per square meter, exhibits an MEK double rub value in the MEK test described herein (using a 1,000 gram weight) of at least about 60.

8. The food can coating composition of claim 2, wherein the polyester polymer has a Tg of at least 70° C.

9. The food can coating composition of claim 1, wherein the polyester polymer includes one or more polycyclic-group-containing structural units derived from tricyclodecanedimethanol, nadic acid, a Diels-Alder reaction product of maleic anhydride and dicyclopentadiene, a naphthalene dicarboxylic acid, a spirocyclic diol, a derivative thereof, or a combination thereof.

10. The food can coating composition of claim 1, wherein at least 25% by weight of total polyol reactants used to make the polyester polymer are cyclic-group-containing polyols.

11. The food can coating composition of claim 1, wherein the polyester polymer comprises at least 20% by weight of structural units derived from tricyclodecanedimethanol, based on the total weight of reactants used to form the polymer.

12. The food can coating composition of claim 4, wherein the polyester polymer includes from 0.1 wt-% to 20 wt-% of structural units derived from the C4 or higher aliphatic diol having a linear chain that is at least four carbons in length, based on the total weight of reactants used to form the polymer.

13. The food can coating composition of claim 1, wherein the reactants used to form the polyester polymer include tricyclodecanedimethanol, 1,6-hexanediol, and terephthalic acid.

14. The food can coating composition of claim 2, wherein the polyester polymer has a number average molecular weight (Mn) of at least 3,000 and less than 9,000.

15. The food can coating composition of claim 1, wherein the coating composition is a solvent-based liquid coating composition that includes less than 2 wt-% of water, if any, and wherein the hydroxyl-reactive crosslinker comprises a blocked isocyanate crosslinker, and wherein the coating composition includes at least 10% by weight of an inorganic pigment, based on the total solids of the coating composition.

16. The food can coating composition of claim 1, wherein the coating composition is an organic-solvent-based white or gold interior food can coating composition.

17. The food can coating composition of claim 1, wherein the polyester polymer has a number average molecular weight (Mn) of 2,000 to 9,500; a glass transition temperature of 60° C. to 130° C.; a hydroxyl value greater than 10 to 50 mg KOH/g resin; and wherein the polyester polymer has about 20 to about 70 weight percent of structural units derived from a tricyclic-group-containing diol, based on the total weight of reactants used to form the polyester polymer.

18. The food can coating composition of claim 17, wherein the tricyclic-group-containing diol is tricyclodecanedimethanol.

19. The food can coating composition of claim 1, wherein the polyester polymer has about 40 to about 70 weight percent of structural units derived from a tricyclic-group-containing diol.

20. The food can coating composition of claim 1, wherein the polyester polymer has a Tg of at least about 80° C. to about 110° C.

21. A food can or portion thereof comprising:
a metal substrate, and
a coating disposed on at least a portion of the substrate formed from a coating composition comprising
a polyester polymer having:
a number average molecular weight (Mn) of less than 10,000,
a glass transition temperature (Tg) of more than 60° C.,
a hydroxyl value greater than 10 and less than 100 mg KOH/g resin, and
one or more cyclic groups in a backbone of the polyester polymer, wherein the one or more cyclic groups comprise one or more polycyclic groups and wherein the one or more polycyclic groups comprise one or more tricyclic groups; and
a hydroxyl-reactive crosslinker.

22. A method comprising:
applying a food can coating composition to a metal substrate of a food can or portion there, the food can coating composition comprising:
a polyester polymer having:
a number average molecular weight (Mn) of less than 10,000,
a glass transition temperature (Tg) of more than 60° C.,
a hydroxyl value greater than 10 and less than 100 mg KOH/g resin, and
one or more cyclic groups in a backbone of the polyester polymer, wherein the one or more cyclic groups comprise one or more polycyclic groups and wherein the one or more polycyclic groups comprise one or more tricyclic groups; and
a hydroxyl-reactive crosslinker; and
curing the coating composition to form a coating, wherein the coating is an interior can coating.

* * * * *